United States Patent [19]
Acero et al.

[11] Patent Number: 5,604,839
[45] Date of Patent: Feb. 18, 1997

[54] METHOD AND SYSTEM FOR IMPROVING SPEECH RECOGNITION THROUGH FRONT-END NORMALIZATION OF FEATURE VECTORS

[75] Inventors: Alejandro Acero; Xuedong Huang, both of Redmond, Wash.

[73] Assignee: Microsoft Corporation, Redmond, Wash.

[21] Appl. No.: 283,271

[22] Filed: Jul. 29, 1994

[51] Int. Cl.$^6$ ........................................................ G10L 9/00
[52] U.S. Cl. ........................................ 395/2.43; 395/2.33
[58] Field of Search ................................ 395/2.33, 2.43, 395/2.35, 2.36, 2.42

[56] References Cited

U.S. PATENT DOCUMENTS 5,185,848  2/1993  Aritsuka et al. ............................ 395/2

FOREIGN PATENT DOCUMENTS 0301199  2/1989  European Pat. Off. .......... G10L 5/06
0487309  5/1992  European Pat. Off. .......... G06K 9/66

OTHER PUBLICATIONS

Acero, A. et al., "Robust HMM–Based Endpoint Detector," in *Eurospeech '93 3rd European Conference on Speech Communication and Technology*, Berlin, Germany, Sep. 21–23, 1993, pp. 1551–1554.

Liu, Fu–Hua et al., "Efficient Cepstral Normalization for Robust Speech Recognition," in *Proceedings of a Human Language Technology Workshop*, Advanced Research Projects Agency, Plainsboro, New Jersey, Mar. 21–24, 1993, pp. 69–74.

Acero, Alejandro, "Acoustical and Environmental Robustness in Automatic Speech Recognition," Dissertation, Carnegie Mellon University, Pittsburgh, Pennsylvania, Sep. 13, 1990, pp. i–xi, 1–141.

Acero, Alejandro, *Acoustical and Environmental Robustness in Automatic Speech Recognition*, Kluwer Academic Publishers, Boston, Massachusetts, 1993, pp. i–xvii, Forward, 1–186.

Dempster, A. P. et al., "Maximum Likelihood from Incomplete Data via the EM Algorithm," *Journal of The Royal Statistical Society* 39(1), 1977, pp. 1–38.

Sankar, Ananth and Chin–Hui Lee, "Stochastic Matching for Robust Speech Recognition," *IEEE Signal Processing Letters* 1(8), Aug. 1994, pp. 124–125.

*Primary Examiner*—Allen R. MacDonald
*Assistant Examiner*—John Michael Grover
*Attorney, Agent, or Firm*—Seed and Berry LLP

[57] ABSTRACT

A method and system for improving speech recognition through front-end normalization of feature vectors are provided. Speech to be recognized is spoken into a microphone, amplified by an amplifier, and converted from an analog signal to a digital signal by an analog-to-digital ("A/D") converter. The digital signal from the A/D converter is input to a feature extractor that breaks down the signal into frames of speech and then extracts a feature vector from each of the frames. The feature vector is input to an input normalizer that normalizes the vector. The input normalizer normalizes the feature vector by computing a correction vector and subtracting the correction vector from the feature vector. The correction vector is computed based on the probability of the current frame of speech being noise and based on the average noise and speech feature vectors for a current utterance and a database of utterances. The normalization of the feature vector reduces the effect of changes in the acoustical environment on the feature vector. The normalized feature vector is input to a pattern matcher that compares the normalized vector to feature models stored in the database to find an exact match or a best match.

21 Claims, 4 Drawing Sheets

5,604,839

METHOD AND SYSTEM FOR IMPROVING SPEECH RECOGNITION THROUGH FRONT-END NORMALIZATION OF FEATURE VECTORS

FIELD OF THE INVENTION

This invention relates generally to speech recognition and, more particularly, to a method and system for improving speech recognition through front-end normalization of feature vectors.

BACKGROUND OF THE INVENTION

A variety of speech-recognition systems have been developed. These systems enable computers to understand speech. This ability is useful for inputting commands or data into computers. Speech recognition generally involves two phases. The first phase is known as training. During training, the system "learns" speech by inputting a large sample of speech and generating models of the speech. The second phase is known as recognition. During recognition, the system attempts to recognize input speech by comparing the speech to the models generated during training and finding an exact match or a best match. Most speech recognition systems have a front-end that extracts some features from the input speech in the form of feature vectors. These feature vectors are used to generate the models during training and are compared to the generated models during recognition.

One problem with such speech recognition systems arises when there are changes in the acoustical environment during and between training and recognition. Such changes could result, for example, from changes in the microphone used, the background noise, the distance between the speaker's mouth and the microphone, and the room acoustics. If changes occur, the system may not work very well because the acoustical environment affects the feature vectors extracted from speech. Thus, different feature vectors may be extracted from the same speech if spoken in different acoustical environments. Since the acoustical environment will rarely remain constant, it is desirable for a speech recognition system to be robust to changes in the acoustical environment. A particular word or sentence should always be recognized as that word or sentence, regardless of the acoustical environment in which the word or sentence is spoken. Some attempts to solve the problem of changes in the acoustical environment have focused on normalizing the input speech feature vectors to reduce the effect of such changes.

One attempt to solve this problem is known as mean normalization. Using mean normalization, the input speech feature vector is normalized by computing the mean of all the feature vectors extracted from the entire speech and subtracting the mean from the input speech feature vector using the function:

$$\hat{x}(t) = x(t) - \frac{1}{n} \sum_{t=0}^{n-1} x(t)$$

where $\hat{x}(t)$ is the normalized input speech feature vector, $x(t)$ is the raw input speech feature vector, and n is the number of feature vectors extracted from the entire speech.

Another attempt to solve this problem is known as signal-to-noise-ratio-dependent ("SNR-dependent") normalization. Using SNR-dependent normalization, the input speech feature vector is normalized by computing the instantaneous SNR of the input speech and subtracting a correction vector that depends on the SNR from the input speech feature vector using the function:

$$\hat{x}(t) = x(t) - y(SNR)$$

where $\hat{x}(t)$ is the normalized input speech feature vector, $x(t)$ is the raw input speech feature vector, and $y(SNR)$ is the correction vector. The correction vectors are precomputed and stored in a look-up table with the corresponding SNR's.

None of the prior attempts to solve the problem of changes in the acoustical environment during and between training and recognition have been very successful. Mean normalization allows the input speech feature vectors to be dynamically adjusted but is not very accurate because it only computes a single mean for all of the feature vectors extracted from the entire speech. SNR-dependent normalization is more accurate than mean normalization because it computes varying correction vectors depending on the SNR of the input speech but it does not dynamically update the values of the correction vectors. Therefore, a solution is needed that both is accurate and dynamically updates the values used to normalize the input speech feature vectors.

SUMMARY OF THE INVENTION

One aspect of the present invention provides a method and system for improving speech recognition through front-end normalization of feature vectors. In a speech recognition system of the present invention, speech to be recognized is spoken into a microphone, amplified by an amplifier, and converted from an analog signal to a digital signal by an analog-to-digital ("A/D") converter. The digital signal from the A/D converter is input to a feature extractor that breaks down the signal into frames of speech and then extracts a feature vector from each of the frames. The feature vector is input to an input normalizer that normalizes the vector. The normalized feature vector is input to a pattern matcher that compares the normalized vector to feature models stored in a database to find an exact match or a best match.

The input normalizer of the present invention normalizes the feature vector by computing a correction vector and subtracting the correction vector from the feature vector. The correction vector is computed based on the probability of the current frame of speech being noise and based on the average noise and speech feature vectors for a current utterance and the database of utterances. The normalization of feature vectors reduces the effect of changes in the acoustical environment on the feature vectors. By reducing the effect of changes in the acoustical environment on the feature vectors, the input normalizer of the present invention improves the accuracy of the speech recognition system.

DETAILED DESCRIPTION OF THE PREFERRED EMBODIMENT

The preferred embodiment of the present invention provides a method and system for improving speech recognition through front-end normalization of feature vectors. The normalization of feature vectors reduces the effect of changes in the acoustical environment on the feature vectors. Such changes could result, for example, from changes in the microphone used, the background noise, the distance between the speaker's mouth and the microphone, and the room acoustics. Without normalization, the effect of changes in the acoustical environment on the feature vectors could cause the same speech to be recognized as different speech. This could occur because the acoustical environment affects the feature vectors extracted from speech. Thus, different feature vectors may be extracted from the same speech if spoken in different acoustical environments. By reducing the effect of changes in the acoustical environment on the feature vectors, the input normalizer of the present invention improves the accuracy of the speech recognition system.

Figure 1:
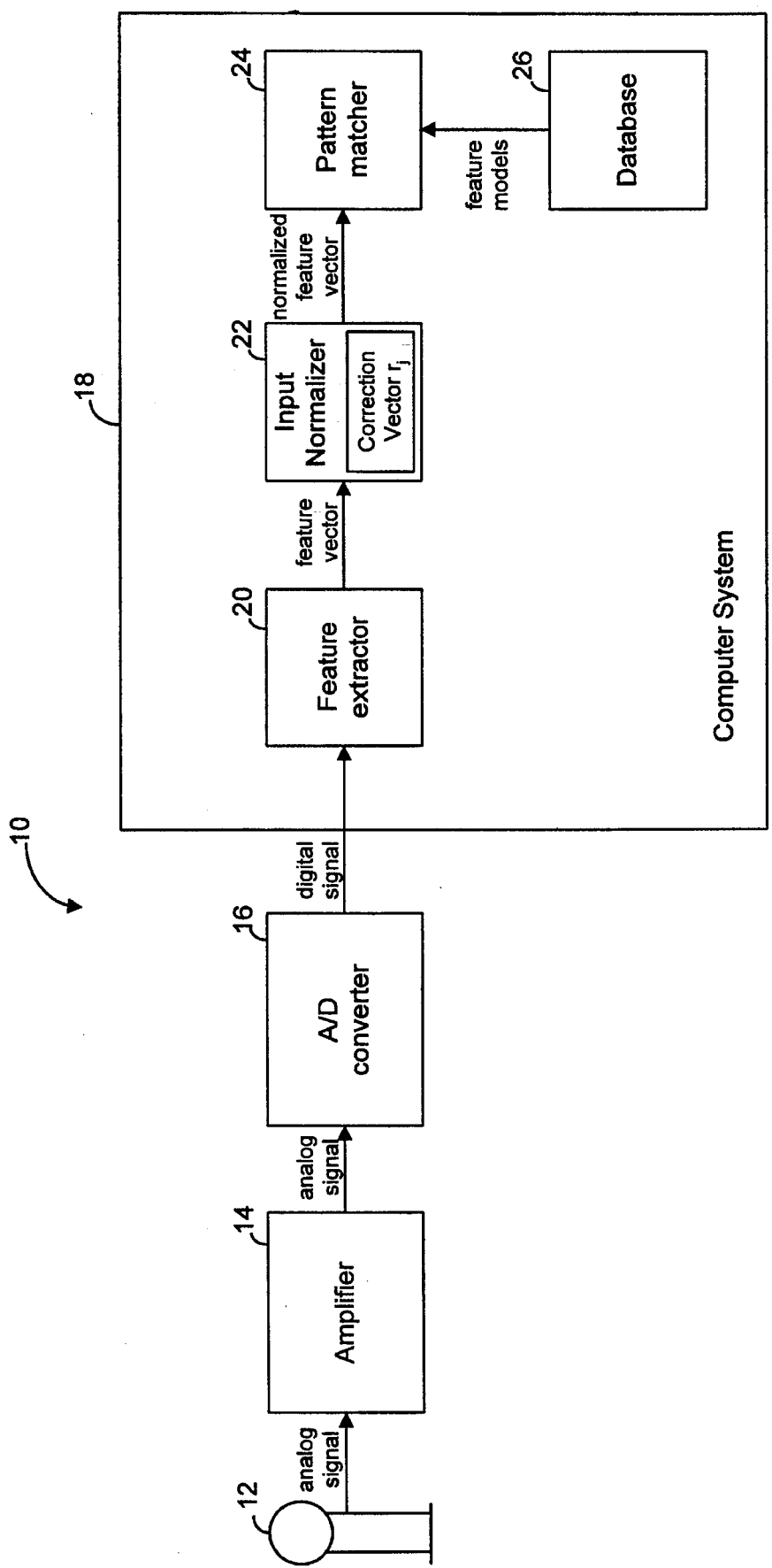
FIG. 1 is a block diagram illustrating a speech recognition system incorporating the principles of the present invention.

FIG. 1 illustrates a speech recognition system 10 incorporating the principles of the present invention. In this system, speech to be recognized is spoken into a microphone 12, amplified by an amplifier 14, and converted from an analog signal to a digital signal by an analog-to-digital ("A/D") converter 16. The microphone 12, amplifier 14, and A/D converter 16 are conventional components and are well-known in the art. The digital signal from the A/D converter 16 is input to a computer system 18. More specifically, the digital signal is input to a feature extractor 20 that extracts certain features from the signal in the form of feature vectors. Speech is composed of utterances. An utterance is the spoken realization of a sentence and typically represents 1 to 10 seconds of speech. Each utterance is broken down into evenly-spaced time intervals called frames. A frame typically represents 10 milliseconds of speech. A feature vector is extracted from each frame of speech. That is, the feature extractor 20 breaks down the digital signal from the A/D converter 16 into frames of speech and then extracts a feature vector from each of the frames. In the preferred embodiment of the present invention, the feature vector extracted from each frame of speech comprises cepstral vectors. Cepstral vectors, and the methods used to extract cepstral vectors from speech, are well-known in the art.

The feature vector is then input to an input normalizer 22 that normalizes the vector. The normalization of the feature vector reduces the effect of changes in the acoustical environment on the feature vector. The normalized feature vector is then input to a pattern matcher 24 that compares the normalized vector to feature models stored in a database 26 to find an exact match or a best match. The feature models stored in the database 26 were generated from known speech. If there is an acceptable match, the known speech corresponding to the matching feature model is output. Otherwise, a message indicating that the speech could not be recognized is output. Typical pattern matchers are based on networks trained by statistical methods, such as hidden Markov models or neural networks. However, other pattern matchers may be used. Such pattern matchers are well-known in the art.

Figure 2:
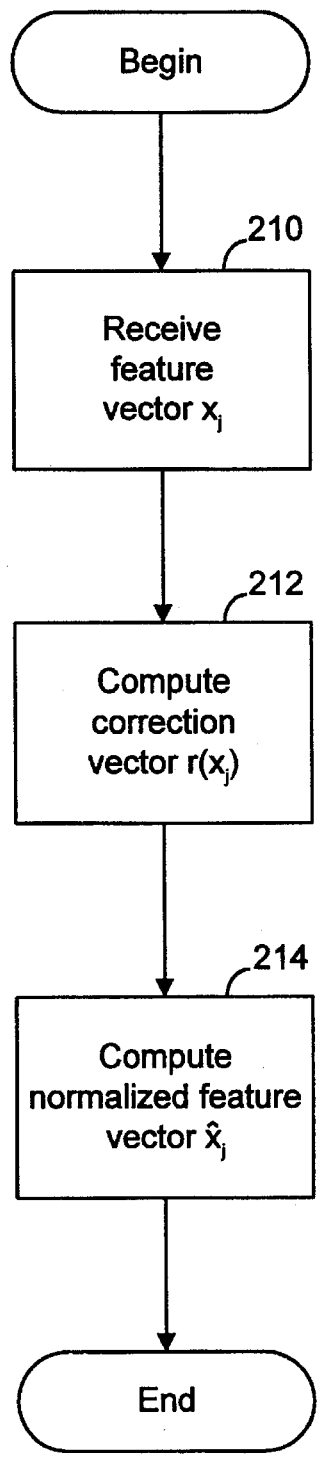
FIG. 2 is a high level flow chart illustrating the steps performed by an input normalizer of the system of FIG. 1.

The steps performed by the input normalizer 22 are shown in FIG. 2. The input normalizer 22 receives the feature vector $x_j$ for the current frame j, where j is an index (step 210). In the preferred embodiment of the present invention, the feature vector comprises cepstral vectors. A cepstral vector is a set of coefficients derived from the energy in different frequency bands by taking the Discrete Cosine Transform ("DCT") of the logarithm of such energies. In the preferred embodiment, the feature vector comprises a static cepstral vector augmented with its first and second order derivatives with time, the delta cepstral vector and the delta-delta cepstral vector, respectively. Each cepstral vector comprises a set of thirteen cepstral coefficients. However, one of ordinary skill in the art will appreciate that cepstral vectors having a different number of cepstral coefficients may be used. Additionally, one of ordinary skill in the art will appreciate that other forms of feature vectors may be used.

Next, the input normalizer 22 computes a correction vector $r(x_j)$ or $r_j$ using the function (step 212):

$$r(x_j) = p_j(n_{j-1} - n_{avg}) + (1-p_j)(s_{j-1} - s_{avg}) \qquad \text{(Eq. 1)}$$

where $p_j$ is the a posteriori probability of the current frame j being noise, $n_{j-1}$ and $s_{j-1}$ are the average noise and speech feature vectors for the current utterance, and $n_{avg}$ and $s_{avg}$ are the average noise and speech feature vectors for the database of utterances 26. The computation of n, s, $n_{avg}$, and $s_{avg}$ will be discussed below. Lastly, the input normalizer 22 computes a normalized feature vector $\hat{x}_j$ using the function (step 214):

$$\hat{x}_j = x_j - r(x_j) \qquad \text{(Eq. 2)}$$

While the feature vector comprises the three cepstral vectors discussed above, in the preferred embodiment of the present invention, only the static cepstral vector is normalized, the delta cepstral vector and the delta-delta cepstral vector are not normalized.

The computation of the correction vector $r(x_j)$ is simplified based on certain assumptions and estimations. First, assume that noise and speech follow a Gaussian distribution. Based on this assumption, the a posteriori probability of the current frame j being noise $p_j$ is computed using the function:

$$p_j = \frac{\xi N(x_j, n_{j-1}, \Sigma n_{(j-1)})}{\xi N(x_j, n_{j-1}, \Sigma n_{(j-1)}) + (1-\xi) N\left(x_j, s_{j-1}, \sum_{s_{(j-1)}}\right)} \qquad \text{(Eq. 3)}$$

where $\xi$ is the a priori probability of the current frame j being noise, $N(x_j, n_{j-1}, \Sigma n_{(j-1)})$ and $N(x_j, s_{j-1}, \Sigma s_{j-1})$ are the Gaussian probability density functions ("pdf's") for noise and speech, respectively, and $\Sigma n_{j-1)}$ and $\Sigma s_{j-1)}$ are the covariance matrices for noise and speech, respectively. The Gaussian pdf's for noise and speech, $N(x_j, n_{j-1}, \Sigma n_{j-1})$ and $N(x_j, s_{j-1}, \Sigma s_{(j-1)})$, are represented using the standard function for Gaussian pdf's:

$$N\left(x_j, n_{j-1}, \sum_{n_{(j-1)}}\right) = \qquad \text{(Eq. 4a)}$$

$$\frac{1}{(2\pi)^{q/2} |\sum_{n_{(j-1)}}|^{1/2}} \exp\left(-\frac{1}{2}(x_j - n_{j-1})^T \sum_{n_{(j-1)}}^{-1} (x_j - n_{j-1})\right)$$

and $$N\left(x_j, s_{j-1}, \sum_{s_{(j-1)}}\right) = \qquad \text{(Eq. 4b)}$$

$$\frac{1}{(2\pi)^{q/2} |\sum_{s_{(j-1)}}|^{1/2}} \exp\left(-\frac{1}{2}(x_j - s_{j-1})^T \sum_{s_{(j-1)}}^{-1} (x_j - s_{j-1})\right)$$

where q is the dimension of $x_j$, exp is the exponential function, and T represents the transpose function.

Then, the a posteriori probability of the current frame j being noise $p_j$ is represented by the sigmoid function:

$$p_j = \frac{1}{1 + \exp\left\{\frac{1}{2} d(x_j)\right\}} \qquad \text{(Eq. 5)}$$

-continued where $$d(x_j) = (x_j - n_{j-1})^T \sum_{n_{(j-1)}}^{-1} (x_j - n_{j-1}) - \quad \text{(Eq. 6)}$$

$$(x_j - s_{j-1})^T \sum_{s_{(j-1)}}^{-1} (x_j - s_{j-1}) + \ln\left(\frac{\sum_{n_{(j-1)}}}{\sum_{s_{(j-1)}}}\right) + 2\ln\left(\frac{1-\xi}{\xi}\right)$$

where $d(x_j)$ or $d_j$ is the distortion. The distortion is an indication of whether a signal is noise or speech. If the distortion is largely negative, the signal is noise; if the distortion is largely positive, the signal is speech; if the distortion is zero, the signal may be noise or speech.

Second, assume that the components of $x_j$ are independent of one another. Based on this assumption, $\Sigma_n$ and $\Sigma_s$ are modelled using diagonal covariance matrices $\sigma_n$ and $\sigma_s$, respectively. Thus, $d(x_j)$ is represented using the function:

$$d(x_j) = \sum_{l=0}^{q} d_l(x_j) = \quad \text{(Eq. 7)}$$

$$\sum_{l=0}^{q} \left\{ \frac{(x_j[l] - n_{j-1}[l])^2}{\sigma^2_{n_{(j-1)}}[l]} - \frac{(x_j[l] - s_{j-1}[l])^2}{\sigma^2_{s_{(j-1)}}[l]} + \ln\left(\frac{\sigma^2_{n_{(j-1)}}[l]}{\sigma^2_{s_{(j-1)}}[l]}\right) + 2\ln\left(\frac{1-\xi}{\xi}\right) \right\}$$

where q is the dimension of $\sigma_n$ and $\sigma_s$. Further, the most important factor in discriminating noise from speech is the power term (1=0). Thus, $d(x_j)$ is approximated using the function:

$$d(x_j) \approx d_0(x_j) = \quad \text{(Eq. 8)}$$

$$\frac{(x_j[0] - n_{j-1}[0])^2}{\sigma^2_{n_{(j-1)}}[0]} - \frac{(x_j[0] - s_{j-1}[0])^2}{\sigma^2_{s_{(j-1)}}[0]} + \ln\left(\frac{\sigma^2_{n_{(j-1)}}[0]}{\sigma^2_{s_{(j-1)}}[0]} \frac{(1-\xi)^2}{\xi^2}\right)$$

Next, the values of n, s, $\sigma_n$, $\sigma_s$, and $\xi$ are estimated using a modified version of the well-known Estimate-Maximize ("EM") algorithm. The EM algorithm is discussed in N. M. Laird, A. P. Dempster, and D. B. Rubin, "Maximum Likelihood from Incomplete Data via the EM Algorithm," *Annals Royal Statistical Society*, 1–38, December 1967. The EM algorithm generates maximum likelihood estimates of the values by refining previous estimates based on new values. This algorithm uses a window function over which the estimates are refined. The window function defines the interval of time over which past estimates are used to refine the current estimates. The standard EM algorithm uses a rectangular window function. A rectangular window function gives equal weight to the data over the entire window. The modified version of the EM algorithm used in the preferred embodiment of the present invention uses an exponential window function. An exponential window function gives more weight to recent data in the window. Thus, the values of n, s, $\sigma_n$, $\sigma_s$, and $\xi$ are estimated using the functions:

$$n_j = \frac{\sum_{k=0}^{\infty} w_k p_{j-k} x_{j-k}}{\sum_{k=0}^{\infty} w_k p_{j-k}} \quad \text{(Eq. 9)}$$

$$s_j = \frac{\sum_{k=0}^{\infty} w_k (1 - p_{j-k}) x_{j-k}}{\sum_{k=0}^{\infty} w_K (1 - p_{j-k})} \quad \text{(Eq. 10)}$$

$$\tau^2_{n(j)} = \frac{\sum_{k=0}^{\infty} w_k p_{j-k} x^2_{j-k}}{\sum_{k=0}^{\infty} w_k p_{j-k}} - n_j^2 \quad \text{(Eq. 11)}$$

$$\tau^2_{s(j)} = \frac{\sum_{k=0}^{\infty} w_k (1 - p_{j-k}) x^2_{j-k}}{\sum_{k=0}^{\infty} w_k (1 - p_{j-k})} - s_j^2 \quad \text{(Eq. 12)}$$

$$\xi_j = \frac{\sum_{k=0}^{\infty} w_k p_{j-k}}{\sum_{k=0}^{\infty} w_k} \quad \text{(Eq. 13)}$$

where $w_k$ is the exponential window function.

The exponential window function $w_k$ is represented by:

$$w_k = \alpha^k \quad \text{(Eq. 14)}$$

where $\alpha$ is a parameter that controls the rate of adaptation. The rate of adaptation determines how much weight is given to past data relative to the current data. The smaller $\alpha$ is, the less weight that is given to past data relative to the current data; the larger $\alpha$ is, the more weight that is given to past data relative to the current data. The value of $\alpha$ is computed using the function:

$$\alpha = (1/2)^{1/TF_s} \quad \text{(Eq. 15)}$$

where T is a time constant and $F_s$ is the sampling frequency of the A/D converter 16. In the preferred embodiment of the present invention, separate $\alpha$'s are used for noise and for speech. The use of separate $\alpha$'s allows noise and speech to be adapted at different rates. In the preferred embodiment in which separate $\alpha$'s are used, a smaller a is used for noise than for speech. Thus, the functions used to estimate the values of n, s, $\sigma_n$, $\sigma_s$, and $\xi$ are reduced to:

$$n_j = \frac{a_{n(j)}}{c_{n(j)}} \quad \text{(Eq. 16)}$$

$$s_j = \frac{a_{s(j)}}{c_{s(j)}} \quad \text{(Eq. 17)}$$

$$\sigma^2_{n(j)} = \frac{b_{n(j)}}{c_{n(j)}} \quad \text{(Eq. 18)}$$

$$\sigma^2_{s(j)} = \frac{b_{s(j)}}{c_{s(j)}} \quad \text{(Eq. 19)}$$

$$\xi_j = (1 - \alpha_n) c_{n(j)} \quad \text{(Eq. 20)}$$

where $$a_{n(j)} = p_j x_j + \alpha_n a_{n(j-1)} \quad \text{(Eq. 21)}$$
$$b_{n(j)} = p_j x_j^2 + \alpha_n b_{n(j-1)} \quad \text{(Eq. 22)}$$
$$c_{n(j)} = p_j + \alpha_n c_{n(j-1)} \quad \text{(Eq. 23)}$$
$$a_{s(j)} = (1 - p_j) x_j + \alpha_s a_{s(j-1)} \quad \text{(Eq. 24)}$$
$$b_{s(j)} = (1 - p_j) x_j^2 + \alpha_s b_{s(j-1)} \quad \text{(Eq. 25)}$$
$$c_{s(j)} = (1 - p_j) + \alpha_s c_{s(j-1)} \quad \text{(Eq. 26)}$$

where $\alpha_n$ and $\alpha_s$ are the parameters that control the rate of adaptation for noise and speech, respectively. The computation of initial values for n, s, $\sigma_n$, $\sigma_s$, $\xi$, $a_n$, $b_n$, $c_n$, $a_s$, $b_s$, and $c_s$ will be discussed below.

Figure 3A:
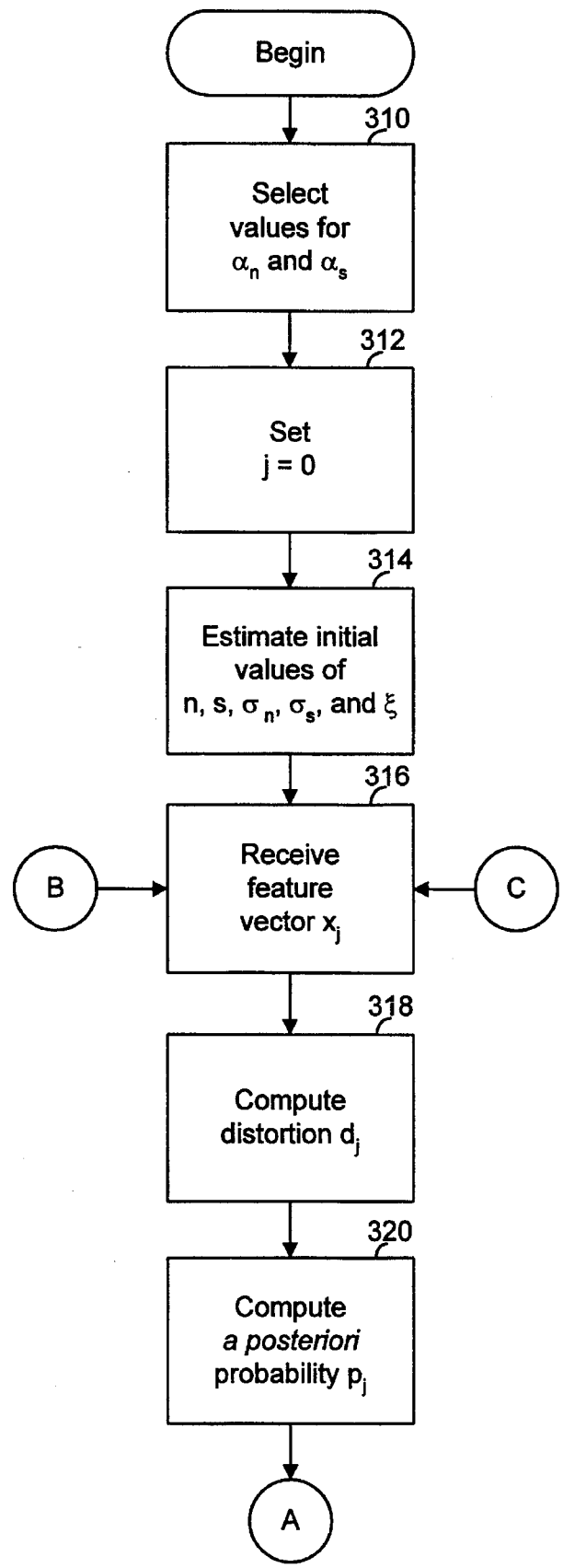
FIGS. 3A and 3B collectively are a high level flow chart illustrating the steps performed in the normalization of feature vectors in the system of FIG. 1.
Figure 3B:
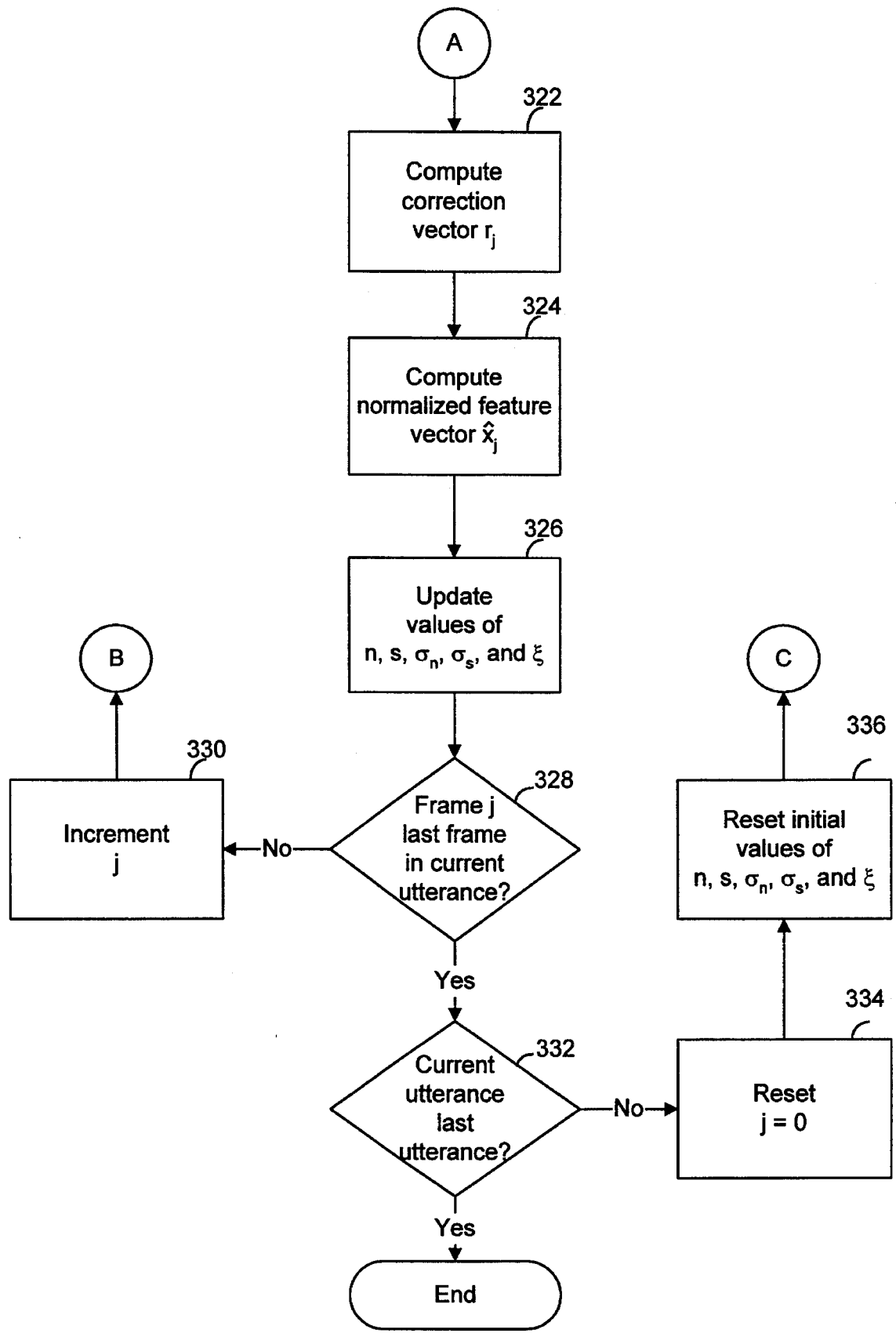

The steps performed in the normalization of a feature vector are shown in FIGS. 3A and 3B. First, values for $\alpha_n$ and $\alpha_s$ are selected (Step 310). The values for $\alpha_n$ and $\alpha_s$ are selected based on the desired rate of adaptation (as discussed above). Additionally, the value of j is set equal to zero (step 312) and initial values for n, s, $\sigma_n$, $\sigma_s$, and $\xi$ are estimated (step 314). The initial values for n, s, $\sigma_n$, $\sigma_s$, and $\xi$ are estimated from the database of utterances 26 using standard EM techniques.

$$n_0 = n_{avg} \qquad (Eq.\ 27)$$
$$s_0 = s_{avg} \qquad (Eq.\ 28)$$
$$\sigma_{n(0)}^2 = \sigma_{n(avg)}^2 \qquad (Eq.\ 29)$$
$$\sigma_{s(0)}^2 = \sigma_{s(avg)}^2 \qquad (Eq.\ 30)$$
$$\xi_0 = \xi_{avg} \qquad (Eq.\ 31)$$
$$a_{n(0)} = \frac{n_{avg}}{1 - \alpha_n} \qquad (Eq.\ 32)$$

$$b_{n(0)} = \frac{(n_{avg})^2 + \sigma_{n(avg)}^2}{1 - \alpha_n} \qquad (Eq.\ 33)$$

$$c_{n(0)} = \frac{1}{1 - \alpha_n} \qquad (Eq.\ 34)$$

$$a_{s(0)} = \frac{s_{avg}}{1 - \alpha_s} \qquad (Eq.\ 35)$$

$$b_{s(0)} = \frac{(s_{avg})^2 + \sigma_{s(avg)}^2}{1 - \alpha_s} \qquad (Eq.\ 36)$$

$$c_{s(0)} = \frac{1}{1 - \alpha_s} \qquad (Eq.\ 37)$$

Then, the feature vector $x_j$ for the current frame j is received (step 316). The distortion $d_j$ is computed using the function (step 318):

$$d_j = \frac{(x_j[0] - n_{j-1}[0])^2}{\sigma_{n(j-1)}[0]} - \frac{(x_j[0] - s_{j-1}[0])^2}{\sigma_{s(j-1)}[0]} + \ln\left(\frac{\sigma_{n(j-1)}^2[0]}{\sigma_{s(j-1)}[0]} \frac{(1 - \xi)^2}{\xi^2}\right) \qquad (Eq.\ 38)$$

The a posteriori probability of the current frame j being noise $p_j$ is computed using the function (step 320):

$$p_j = \frac{1}{1 + \exp\left\{\frac{d_j}{2}\right\}} \qquad (Eq.\ 39)$$

The correction vector $r_j$ is computed using the function (step 322):

$$r_j[l] = p_j(n_{j-1}[l] - n_{avg}[l]) + (1 - p_j)(s_{j-1}[l] - s_{avg}[l]) \qquad (Eq.\ 40)$$

for l=0,1, . . . , m

The normalized feature vector $\hat{x}_j$ is computed using the function (step 324):

$$\hat{x}_j[l] = x_j[l] - r_j[l] \qquad (Eq.\ 41)$$

The values of n, s, $\sigma_n$, $\sigma_s$, and $\xi$ are updated using the functions (step 326):

$$n_j[l] = \frac{a_{n(j)}[l]}{c_{n(j)}[l]} \qquad (Eq.\ 42)$$

$$s_j[l] = \frac{a_{s(j)}[l]}{c_{s(j)}[l]} \qquad (Eq.\ 43)$$

$$\sigma_{n(j)}^2[l] = \frac{b_{n(j)}[l]}{c_{n(j)}[l]} - (n_j[l])^2 \qquad (Eq.\ 44)$$

$$\sigma_{s(j)}^2[l] = \frac{b_{s(j)}[l]}{c_{s(j)}[l]} - (s_j[l])^2 \qquad (Eq.\ 45)$$

$$\xi_j[l] = (1 - \alpha_n)c_{n(j)}[l] \qquad (Eq.\ 46)$$

for $l = 0, 1, \ldots, m$
where
$$a_{n(j)}[l] = p_j x_j[l] + \alpha_n a_{n(j-1)}[l] \qquad (Eq.\ 47)$$
$$b_{n(j)}[l] = p_j x_j^2[l] + \alpha_n b_{n(j-1)}[l] \qquad (Eq.\ 48)$$
$$c_{n(j)} = p_j + \alpha_n c_{n(j-1)} \qquad (Eq.\ 49)$$
$$a_{s(j)}[l] = (1 - p_j)x_j[l] + \alpha_s a_{s(j-1)}[l] \qquad (Eq.\ 50)$$
$$b_{s(j)}[l] = (1 - p_j)x^2[l] + \alpha_2 b_{s(j-1)}[l] \qquad (Eq.\ 51)$$
$$c_{s(j)} = (1 - p_j) + \alpha_s c_{s(j-1)} \qquad (Eq.\ 52)$$

Lastly, the input normalizer 22 determines whether frame j is the last frame in the current utterance (step 328). If frame j is not the last frame in the current utterance, j is incremented (step 330) and steps 316 through 326 are repeated for the next frame. If frame j is the last frame in the current utterance, the input normalizer 22 determines whether the current utterance is the last utterance (step 332). If the current utterance is not the last utterance, j is reset to zero (step 334), the values of n, s, $\sigma_n$, $\sigma_s$, and $\xi$ are reset to the estimated initial values (step 336), and steps 316 through 326 are repeated for each frame in the next utterance. If the current utterance is the last utterance, the input normalizer 22 returns.

In order to reduce the computational complexity of the input normalizer 22 of the present invention, one of ordinary skill in the art will appreciate that several modifications could be made to the input normalizer. First, the last term could be eliminated from the function (Eq. 38) used to compute the distortion $d_j$. This term does not significantly affect the value of the distortion $d_j$, but is expensive to compute because it involves a logarithm. Additionally, the a posteriori probability of the current frame j being noise $p_j$ could be computed using a look-up table. This table would contain the possible values for the distortion $d_j$ and the corresponding values for the a posteriori probability $p_j$. Lastly, the values of n, s, $\sigma_n$, and $\sigma_s$ could be updated every few frames, instead of every frame, and the value of $\xi$ could be kept at its initial value and not updated at all. Each of these modifications will improve the efficiency of the input normalizer 22 without significantly affecting the accuracy of the input normalizer.

While the invention has described the normalization of feature vectors only during recognition, the preferred embodiment of the present invention involves the normalization of feature vectors during training as well. Specifically, each utterance in the database 26 is normalized according to the principles of the present invention and then the system is retrained using the database of normalized utterances. The database of normalized utterances is then used during recognition as described above.

One of ordinary skill in the art will now appreciate that the present invention provides a method and system for improving speech recognition through front-end normalization of feature vectors. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. A method for improving speech recognition through front-end normalization of feature vectors, wherein the speech being recognized comprises utterances, each utterance comprising frames of speech, each frame of speech being represented by a feature vector, the method comprising the steps of:

providing a database of known utterances, the database of utterances having an average noise feature vector and an average speech feature vector;

receiving a feature vector representing a frame of speech in an utterance to be recognized, the frame of speech having a probability of being noise, the utterance having an average noise feature vector and an average speech feature vector;

computing a correction vector based on the probability of the frame of speech being noise and based on the average noise and speech feature vectors for the utterance and the database of utterances; and computing a normalized feature vector based on the feature vector and the correction vector.

2. The method of claim 1, wherein the step of receiving a feature vector comprises the step of receiving a cepstral vector.

3. The method of claim 1, wherein the probability of the frame of speech being noise and the average noise and speech feature vectors for the utterance are updated for each frame of speech.

4. The method of claim 1, wherein the step of computing a correction vector includes the steps of:

computing the probability of the frame of speech being noise based on a distortion measure of the frame of speech;

computing the average noise and speech feature vectors for the utterance;

computing the average noise and speech feature vectors for the database of utterances; and computing the correction vector based on the probability of the frame of speech being noise, the difference between the average noise for the utterance and the average noise for the database of utterances, and the difference between the speech vectors for the utterance and the average speech vectors for the database of utterances.

5. A method for improving speech recognition through front-end normalization of feature vectors, wherein the speech being recognized comprises utterances, each utterance comprising frames of speech, each frame of speech being represented by a feature vector, the method comprising the steps of:

providing a database of known utterances, the database of utterances having an average noise feature vector and an average speech feature vector;

receiving a feature vector $x_j$ representing a frame of speech j in an utterance to be recognized, the frame of speech having an a posteriori probability of being noise, the utterance having an average noise feature vector and an average speech feature vector;

computing a correction vector $r(x_j)$ as:

$$r(x_j) = p_j(n_{j-1} - n_{avg}) + (1 - p_j)(s_{j-1} - s_{avg})$$

wherein $p_j$ is the a posteriori probability of the frame of speech j being noise, $n_{j-1}$ and $s_{j-1}$ are the average noise and speech feature vectors for the utterance, and $n_{avg}$ and $s_{avg}$ are the average noise and speech feature vectors for the database of utterances; and computing a normalized feature vector $\hat{x}_j$ as:

$$\hat{x}_j = x_j - r(x_j).$$

6. The method of claim 5, wherein the step of receiving a feature vector includes the step of receiving a cepstral vector.

7. The method of claim 5, wherein the a posteriori probability of the frame of speech being noise and the average noise and speech feature vectors for the utterance are updated for each frame of speech.

8. The method of claim 5, wherein the a posteriori probability of the frame of speech j being noise $p_j$ is computed as:

$$p_j = \frac{\xi N(x_j, n_{j-1}, \Sigma_{n_{(j-1)}})}{\xi N(x_j, n_{j-1}, \Sigma_{n_{(j-1)}}) + (1-\xi)N(x_j, s_{j-1}, \Sigma_{n_{(j-1)}})}$$

wherein $\xi$ is an a priori probability of the frame of speech j being noise, $N(x_j, n_{j-1}, \xi n_{(j-1)})$ and $N(x_j, s_{j-1}, \xi s_{(j-1)})$ are Gaussian probability density functions for noise and speech, respectively, and $\xi n_{(j-1)}$ and $\xi s_{(j-1)}$ are covariance matrices for noise and speech, respectively.

9. The method of claim 8, wherein the Gaussian probability density functions for noise and speech, $N(x_j, n_{j-1}, \xi n_{(j-1)})$ and $N(x_j, s_{j-1}, \xi s_{(j-1)})$, are computed as:

$$N(x_j, n_{j-1}, \Sigma_{n_{(j-1)}}) = \frac{1}{(2\pi)^{q/2}|\Sigma_{n_{(j-1)}}|^{1/2}} \exp\left(-\frac{1}{2}(x_j - n_{j-1})^T \Sigma_{n_{(j-1)}}^{-1}(x_j - n_{j-1})\right)$$

and $$N(x_j, s_{j-1}, \Sigma_{s_{(j-1)}}) = \frac{1}{(2\pi)^{q/2}|\Sigma_{s_{(j-1)}}|^{1/2}} \exp\left(-\frac{1}{2}(x_j - n_{j-1})^T \Sigma_{s_{(j-1)}}^{-1}(x_j - s_{j-1})\right)$$

wherein q is a dimension of $x_j$, exp is an exponential function, and T represents a transpose function.

10. The method of claim 5, wherein the a posteriori probability of the frame of speech j being noise $p_j$ is computed as:

$$p_j = \frac{1}{1 + \exp\left\{\frac{1}{2} d(x_j)\right\}}$$

wherein $d(x_j)$ is a distortion measure of the frame of speech j.

11. The method of claim 10, wherein the distortion measure $d(x_j)$ is computed as:

$$d(x_j) = (x_j - n_{j-1})^T \Sigma_{n_{(j-1)}}^{-1}(x_j - n_{j-1}) - (x_j - s_{j-1})^T \Sigma_{s_{(j-1)}}^{-1}(x_j - s_{j-1}) + \ln\left(\frac{\Sigma_{n(j-1)}}{\Sigma_{s(j-1)}}\right) + 2\ln\left(\frac{1-\xi}{\xi}\right).$$

12. The method of claim 10, wherein the distortion measure $d(x_j)$ is computed as:

$$d(x_j) = \sum_{l=0}^{q} d_l(x_j) =$$

$$\sum_{l=0}^{q} \left\{ \frac{(x_j[l] - n_{j-1}[l])^2}{\sigma_{n(j-1)}^2[l]} - \frac{(x_j[l] - s_{j-1}[l])^2}{\sigma_{s(j-1)}^2[l]} + \ln\left(\frac{\sigma_{n(j-1)}^2[l]}{\sigma_{s(j-1)}^2[l]}\right) + 2\ln\left(\frac{1-\xi}{\xi}\right) \right\}$$

wherein q is a dimension of $\sigma_n$ and $\sigma_s$.

13. The method of claim 10, wherein the distortion measure $d(x_j)$ is computed as:

$$d(x_j) = d_0(x_j) = \frac{(x_j[0] - n_{j-1}[0])^2}{\sigma^2_{n(j-1)}[0]} - \frac{(x_j[0] - s_{j-1}[0])^2}{\sigma^2_{s(j-1)}[0]} + \ln\left(\frac{\sigma^2_{n(j-1)}[0]}{\sigma^2_{s(j-1)}[0]} \frac{(1-\xi)^2}{\xi^2}\right).$$

14. The method of claim 13, wherein the average noise and speech feature vectors for the utterance are computed as:

$$n_j = \frac{\sum_{k=0}^{\infty} w_k p_{j-k} x_{j-k}}{\sum_{k=0}^{\infty} w_k p_{j-k}} \text{ and } s_j = \frac{\sum_{k=0}^{\infty} w_k (1 - p_{j-k}) x_{j-k}}{\sum_{k=0}^{\infty} w_k (1 - p_{j-k})}$$

wherein $w_k$ is an exponential window function represented as:

$$w_k = \alpha^k$$

wherein $\alpha$ is a parameter that controls a rate of adaptation.

15. The method of claim 14, wherein the diagonal covariance matrices for noise and speech are computed as:

$$\sigma^2_{n(j)} = \frac{\sum_{k=0}^{\infty} w_k p_{j-k} x^2_{j-k}}{\sum_{k=0}^{\infty} w_k p_{j-k}} - n_j^2$$

and $$\sigma^2_{n(j)} = \frac{\sum_{k=0}^{\infty} w_k (1 - p_{j-k}) x^2_{j-k}}{\sum_{k=0}^{\infty} w_k (1 - p_{j-k})} - s_j^2.$$

16. The method of claim 15, wherein the a priori probability of the frame of speech j being noise $\xi_j$ is computed as:

$$\xi_j = \frac{\sum_{k=0}^{\infty} w_k p_{j-k}}{\sum_{k=0}^{\infty} w_k}.$$

17. The method of claim 13, wherein the average noise and speech feature vectors for the utterance are computed as:

$$n_j = \frac{a_{n(j)}}{c_{n(j)}} \text{ and } s_j = \frac{a_{s(j)}}{c_{s(j)}}$$

wherein $$a_{n(j)} = p_j x_j + \alpha_n a_{n(j-1)}, \; c_{n(j)} = p_j + \alpha_n c_{n(j-1)},$$

$$a_{s(j)} = (1 - p_j)x_j + \alpha_s a_{s(j-1)}, \text{ and } c_{s(j)} = (1 - p_j) + \alpha_s c_{s(j-1)}$$

and wherein $\alpha_n$ and $\alpha_s$ are parameters that control rates of adaptation for noise and speech, respectively.

18. The method of claim 17, wherein the diagonal covariance matrices for noise and speech are computed as:

$$\sigma^2_{n(j)} = \frac{b_{n(j)}}{c_{n(j)}} - n_j^2 \text{ and } \sigma^2_{s(j)} = \frac{b_{s(j)}}{c_{s(j)}} - s_j^2$$

wherein $$b_{n(j)} = p_j x_j^2 + \alpha_n b_{n(j-1)} \text{ and } b_{s(j)} = (1 - p_j)x_j^2 + \alpha_s b_{s(j-1)}.$$

19. The method of claim 18, wherein the a priori probability of the frame of speech j being noise $\xi_j$ is computed as:

$$\xi_j = (1 - \alpha_n) c_{n(j)}.$$

20. A system for improving speech recognition through front-send normalization of feature vectors, wherein the speech being recognized comprises utterances, each utterance comprising frames of speech, each frame of speech being represented by a feature vector, the system comprising:
- a database of known utterances, the database of utterances having an average noise feature vector and an average speech feature vector; and
- an input normalizer for:
  receiving a feature vector representing a frame of speech in an utterance to be recognized, the frame of speech having a probability of being noise, the utterance having an average noise feature vector and an average speech feature vector;
  computing a correction vector based on the probability of the frame of speech being noise and based on the average noise and speech feature vectors for the utterance and the database of utterances; and
  computing a normalized feature vector based on the feature vector and the correction vector.

21. A system for improving speech recognition through front-end normalization of feature vectors, wherein the speech being recognized comprises utterances, each utterance comprising frames of speech, each frame of speech being represented by a feature vector, the system comprising:
- a database of known utterances, the utterances being represented by feature models, the database of utterances having an average noise feature vector and an average speech feature vector;
- a feature extractor for extracting a feature vector from a frame of speech in an utterance to be recognized, the frame of speech having a probability of being noise, the utterance having an average noise feature vector and an average speech feature vector;
- an input normalizer for normalizing the feature vector by: (i) computing a correction vector based on the probability of the frame of speech being noise and based on the average noise and speech feature vectors for the utterance and the database of utterances, and (ii) computing a normalized feature vector based on the feature vector and the correction vector; and
- a pattern matcher for comparing the normalized feature vector to the feature models in the database.

* * * * *

UNITED STATES PATENT AND TRADEMARK OFFICE
CERTIFICATE OF CORRECTION

PATENT NO. : 5,604,839
DATED : February 18, 1997
INVENTOR(S) : Alejandro Acero and Xuedong Huang It is certified that error appears in the above-indentified patent and that said Letters Patent is hereby corrected as shown below:

In column 10, claim 8, line 6. following "noise," please delete "$N(\mathbf{x}_j, \mathbf{n}_{j-1}, \xi_{n(j-1)})$ and $N(\mathbf{x}_j, \mathbf{s}_{j-1}, \xi_{s(j-1)})$", and insert -- $N(\mathbf{x}_j, \mathbf{n}_{j-1}, \Sigma_{n(j-1)})$ and $N(\mathbf{x}_j, \mathbf{s}_{j-1}, \Sigma_{s(j-1)})$ --.

In column 10, claim 8, line 8, following "and", please delete "$\xi_{n(j-1)}$ and $\xi_{s(j-1)}$", and insert -- $\Sigma_{n(j-1)}$ and $\Sigma_{s(j-1)}$ --.

In column 10, claim 9, line 2, following "speech," please delete "$N(\mathbf{x}_j, \mathbf{n}_{j-1}, \xi_{n(j-1)})$ and $N(\mathbf{x}_j, \mathbf{s}_{j-1}, \xi_{s(j-1)})$", and insert -- $N(\mathbf{x}_j, \mathbf{n}_{j-1}, \Sigma_{n(j-1)})$ and $N(\mathbf{x}_j, \mathbf{s}_{j-1}, \Sigma_{s(j-1)})$ --.

UNITED STATES PATENT AND TRADEMARK OFFICE
CERTIFICATE OF CORRECTION

PATENT NO. : 5,604,839
DATED : February 18, 1997
INVENTOR(S) : Alejandro Acero and Xuedong Huang It is certified that error appears in the above-indentified patent and that said Letters Patent is hereby corrected as shown below:

In column 10, claim 9, line 8, please delete $$" N(\mathbf{x}_j, \mathbf{s}_{j-1}, \Sigma_{\mathbf{s}(j-1)}) = \frac{1}{(2\pi)^{q/2} |\Sigma_{\mathbf{s}(j-1)}|^{1/2}} \exp(-\frac{1}{2}(\mathbf{x}_j - n_{j-1})^T \Sigma_{\mathbf{s}\ (j-1)}^{-1} (\mathbf{x}_j - \mathbf{s}_{j-1})) ",$$ and insert $$-- N(\mathbf{x}_j, \mathbf{s}_{j-1}, \Sigma_{\mathbf{s}(j-1)}) = \frac{1}{(2\pi)^{q/2} |\Sigma_{\mathbf{s}(j-1)}|^{1/2}} \exp(-\frac{1}{2}(\mathbf{x}_j - \mathbf{s}_{j-1})^T \Sigma_{\mathbf{s}\ (j-1)}^{-1} (\mathbf{x}_j - \mathbf{s}_{j-1})) --.$$

In column 12, claim 20, line 2, following "front-", please delete "send" and insert --end--.

Signed and Sealed this

Fourteenth Day of October, 1997

Attest:

BRUCE LEHMAN

Attesting Officer     Commissioner of Patents and Trademarks